3,267,825
VIBRATORY ROLLERS
William Arthur Owen, Bardsey, near Leeds, and Geoffrey William Bee, Moortown, Leeds, England, assignors to Thomas Green and Son Limited, Leeds, Yorkshire, England, a British company
Filed June 13, 1963, Ser. No. 287,611
Claims priority, application Great Britain, Aug. 17, 1962, 31,724/62
2 Claims. (Cl. 94—50)

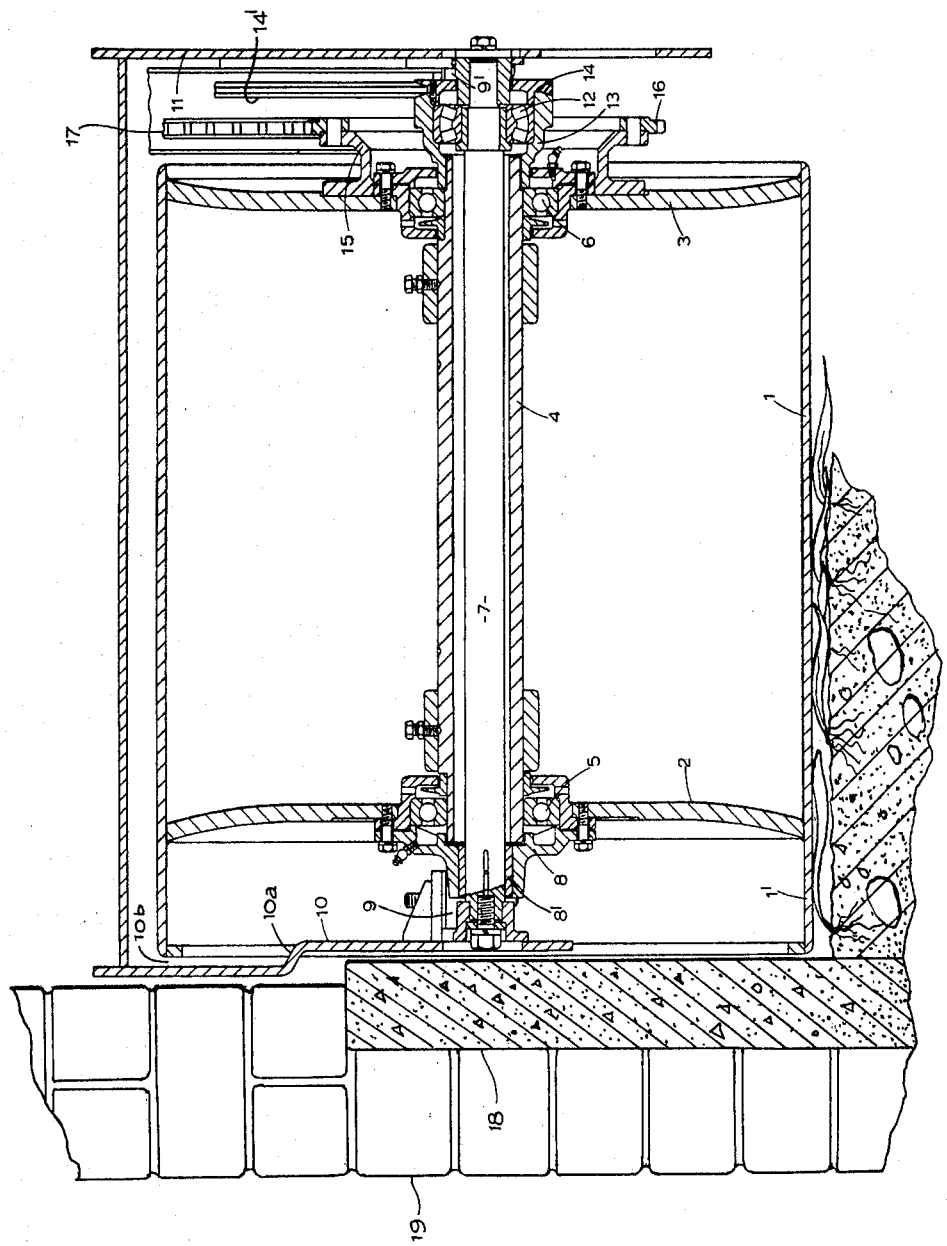

This invention relates to vibratory rollers for compacting earth or similar operations. The device comprises a roller body rotatable with respect to a main axle. The main axle is surrounded by a vibrator tube which is eccentric and is rotatable at high speed to impart vibration to the roller body. The main axle is resiliently connected to a casing on which is mounted a motor, which drives the vibration imparting tube and which may also drive the roller body, if desired.

In conventional rollers of this type, the drive to the vibration imparting means and to the roller body for propulsion purposes and the resilient mountings for avoiding vibration being taken to the casing necessitate substantial projection of the frame or casing beyond the ends of the roller body which prevent it rolling the ground or a path close to a wall or similar upstanding obstruction.

The object of the present invention is to provide a substantially clear ended roller which is connected to the casing at both ends by resilient mountings with only a slight projection beyond one end of the roller, thus permitting the roller to operate close to a wall.

Now in order that the invention may be clearly understood and readily carried into effect an embodiment is by way of example hereinafter more fully described with reference to the accompanying drawing forming a part hereof.

Referring to the drawing:

The single figure is a view in axial section showing a roller embodying the invention in operation adjacent to a high wall shown in end elevation and to a lower wall which is shown in transverse section.

The roller illustrated comprises a hollow cylindrical body 1 with dished end walls 2, 3. The roller body 1 is journalled on an eccentric mass tube 4 by ball bearings 5, 6 between the end walls 2, 3, respectively, and the tube 4. A main nonrotatable axle 7 extends through the tube 4. The end wall 2 is inset from the end of the body 1 and has fast therewith a bushing 8 which is journaled by a bearing 8' on an end portion of the main axle 7 which is connected by a resilient mounting 9 to the depending arm member portion 10 of the casing on which the rotor (not shown) is mounted. The arm member 10 has an offset jog 10a formed therein which causes the member 10 to extend with a small clearance 10b generally radially outwardly past the periphery of the roller member 1.

The opposite end of the axle 7 is similarly connected by a resilient mounting 9' to the opposite depending arm portion 11 of the casing and this end of the axle 7 carries a roller bearing 12. Bearing 12 is mounted in a support 13 fast with the eccentric tube 4 and supports the adjacent end of such tube. The bearing support 13 is connected to a drive pulley 14 with which cooperates endless V-belt 14' to rotate the eccentric tube 4 at high speed.

The end wall 3 carries a mounting ring 15 by means of which the propulsion drive is transmitted to the roller body 1, the mounting ring 15 carrying a sprocket 16 around which passes a driving chain 17 driven by the motor (not shown) on the casing.

The end portion of the roller body 1 beyond the end wall 2 forms a portion 1' the edge of which projects slightly beyond the end of the main axle 7 and its resilient mounting 9. The portion 10 of the casing is shaped to lie within the compass of such roller body extension portion 1' except at the periphery of the roller body 1, where it has an offset jog formed therein so that it projects slightly beyond the outer end edge portion of the roller body to extend therearound.

It will be observed that the wall thickness of the tube 4 is substantially uniform intermediate its ends. At its ends, where it is mounted in the ball bearing 5 and 6, it is formed with axially aligned cylindrical portions of reduced diameter which are eccentric with respect to the central portion of the tube 4. The longitudinal axis of the tube 4 is thus laterally spaced from the longitudinal axis of the main axle 7.

In operation, the end portion 1' of the roller body 1 may engage directly against a low wall 18 which is only slightly higher than the height of the main axle 7 above the ground. In the case of high walls, such as 19, the open end portion 1' is spaced slightly away from the wall by the offset jog in the portion 10 of the casing.

While we have shown and described what we believe to be the best embodiments of our invention, it will be apparent to those skilled in the art that various changes and modifications may be made therein without departing from the spirit and scope of the invention as defined in the appended claims.

We claim:

1. A vibratory roller of the class described, comprising: a hollow cylindrical roller member open at one end; an axle member upon which said roller member is journalled, one end of said axle member being located axially inwardly of said open end, the other end portion of said axle member extending axially outwardly beyond the other end of said roller member; revoluble eccentric means on said axle member for imparting vibrations to said roller member; drive means for said eccentric means on the other end portion of said roller member; a first arm member having one end connected to said one end of said axle axially inwardly of said open end of said roller member, said first arm member having an offset jog formed therein, said jog being located within said open end, said jog causing said first arm member to extend with a small clearance generally radially outwardly past the periphery of said roller member at said open end; a second arm member having one end connected to said other end portion of said axle member axially outwardly of said drive means; and supporting means for motor means rigidly interconnecting the other ends of said first and second arm members.

2. A vibratory roller of the class described, comprising: a hollow cylindrical roller member open at one end; an axle member upon which said roller member is journalled, one end of said axle member being located axially inwardly of said open end, the other end portion of said axle member extending axially outwardly beyond the other end of said roller member; revoluble eccentric means for imparting vibrations to said roller member, said eccentric means including a tubular portion journalled for rotation on said axle member; drive means for said eccentric means on the other end portion of said roller member; a first arm member having one end connected to said one end of said axle axially inwardly of said open end of said roller member, said first arm member having an offset jog formed therein, said jog being located within said open end, said jog causing said first arm member to extend with a small clearance generally radially outwardly past the periphery of said roller member at said open end; a second arm member having one end connected to said other end portion of said axle member axially outwardly of said drive means; supporting means for motor means rigidly interconnecting the other ends of said first and second arm members; two disc members one of which is axially spaced inwardly from said open end of said roller member, the peripheries of said disc members being connected directly to said roller member; and bearing means carried by each of said disc members concentrically with the longitudinal axis of said axle member, said tubular portion of said eccentric means being journalled in said bearing means for the transmission of vibratory forces radially to said roller member through said bearing means and said disc members.

References Cited by the Examiner

UNITED STATES PATENTS

| | | | |
|---|---|---|---|
| 2,671,386 | 3/1954 | Kerridge | 94—50 |
| 2,873,656 | 2/1959 | Andersson | 94—50 |
| 3,105,424 | 10/1963 | Dion | 94—50 |

FOREIGN PATENTS

| | | |
|---|---|---|
| 819,119 | 10/1959 | Great Britain. |
| 873,419 | 7/1961 | Great Britain. |

JACOB L. NACKENOFF, *Primary Examiner.*